June 12, 1923.

J. M. YOUNG

GLASS BLOWING MACHINE

Filed Oct. 21, 1916

Witnesses

J.M. Young
Inventor, by C.A. Snow & Co.
Attorneys.

June 12, 1923.
J. M. YOUNG
GLASS BLOWING MACHINE
Filed Oct. 21, 1916
1,458,454
6 Sheets-Sheet 3
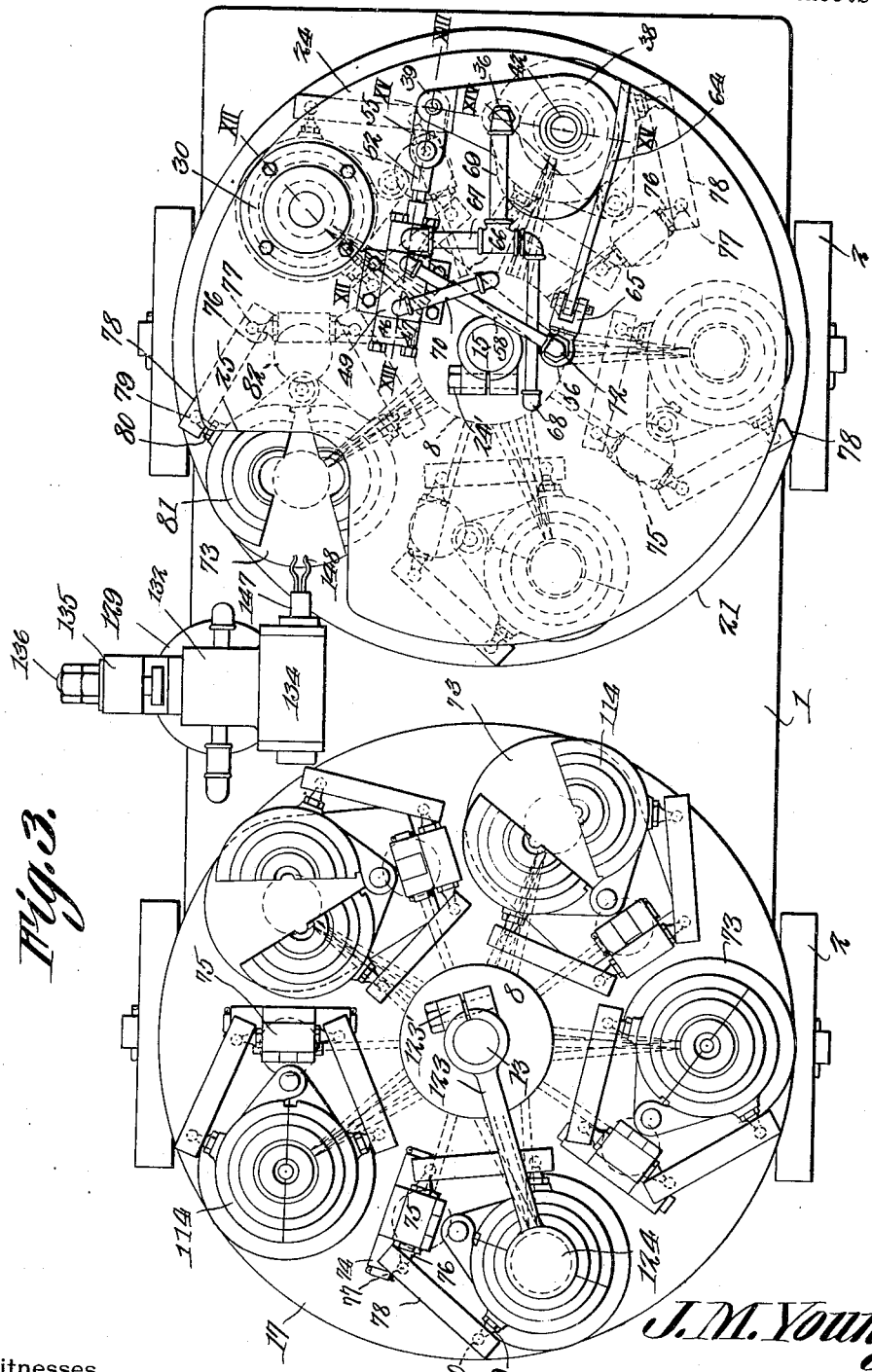
Witnesses
JR Tinley
RL Parker
J. M. Young
Inventor,
by C. A. Snow & Co.
Attorneys.

June 12, 1923.
J. M. YOUNG
GLASS BLOWING MACHINE
Filed Oct. 21, 1916
6 Sheets-Sheet 4
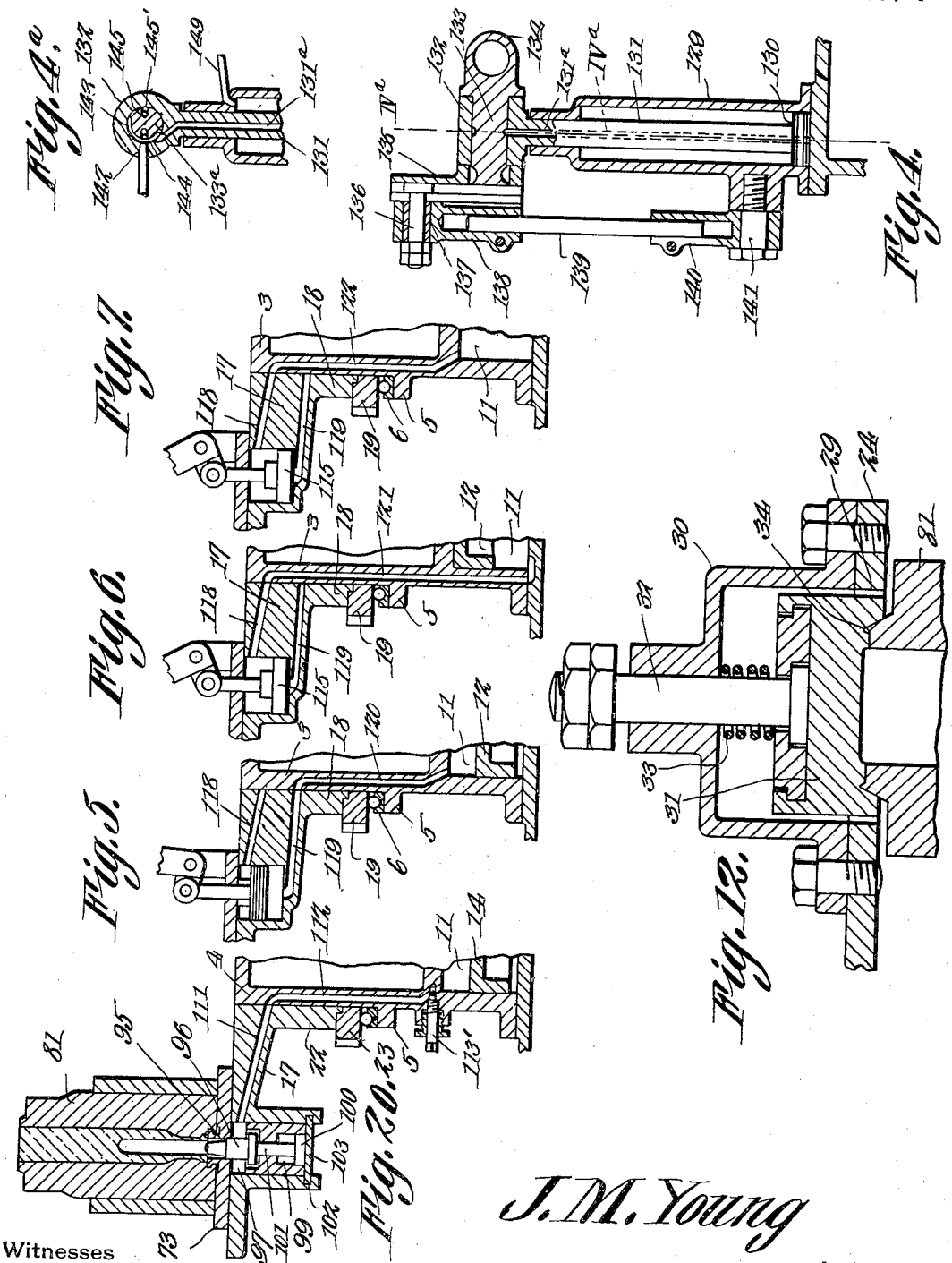
Witnesses
J. M. Young
Inventor,
by C. A. Snow & Co.
Attorneys.

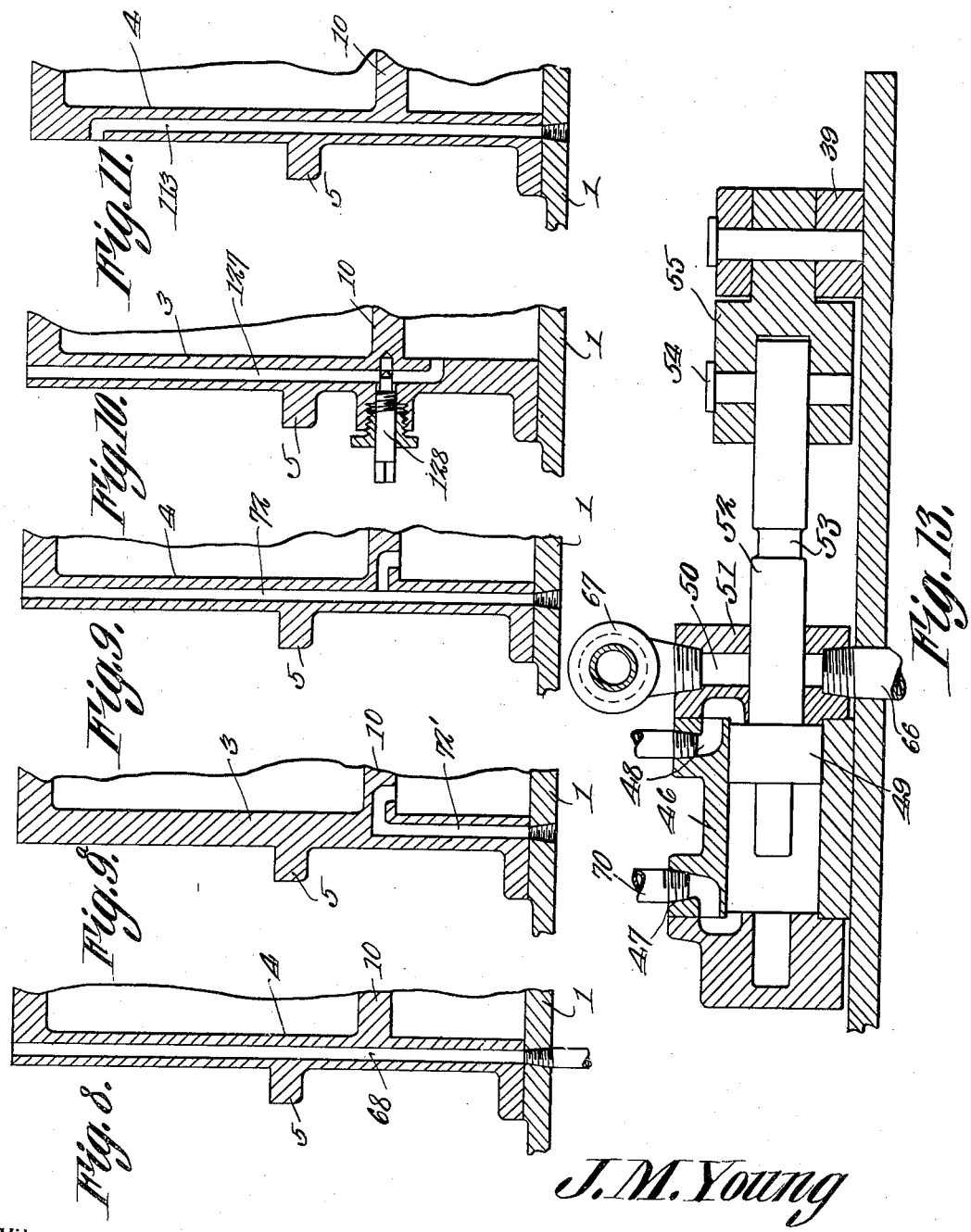

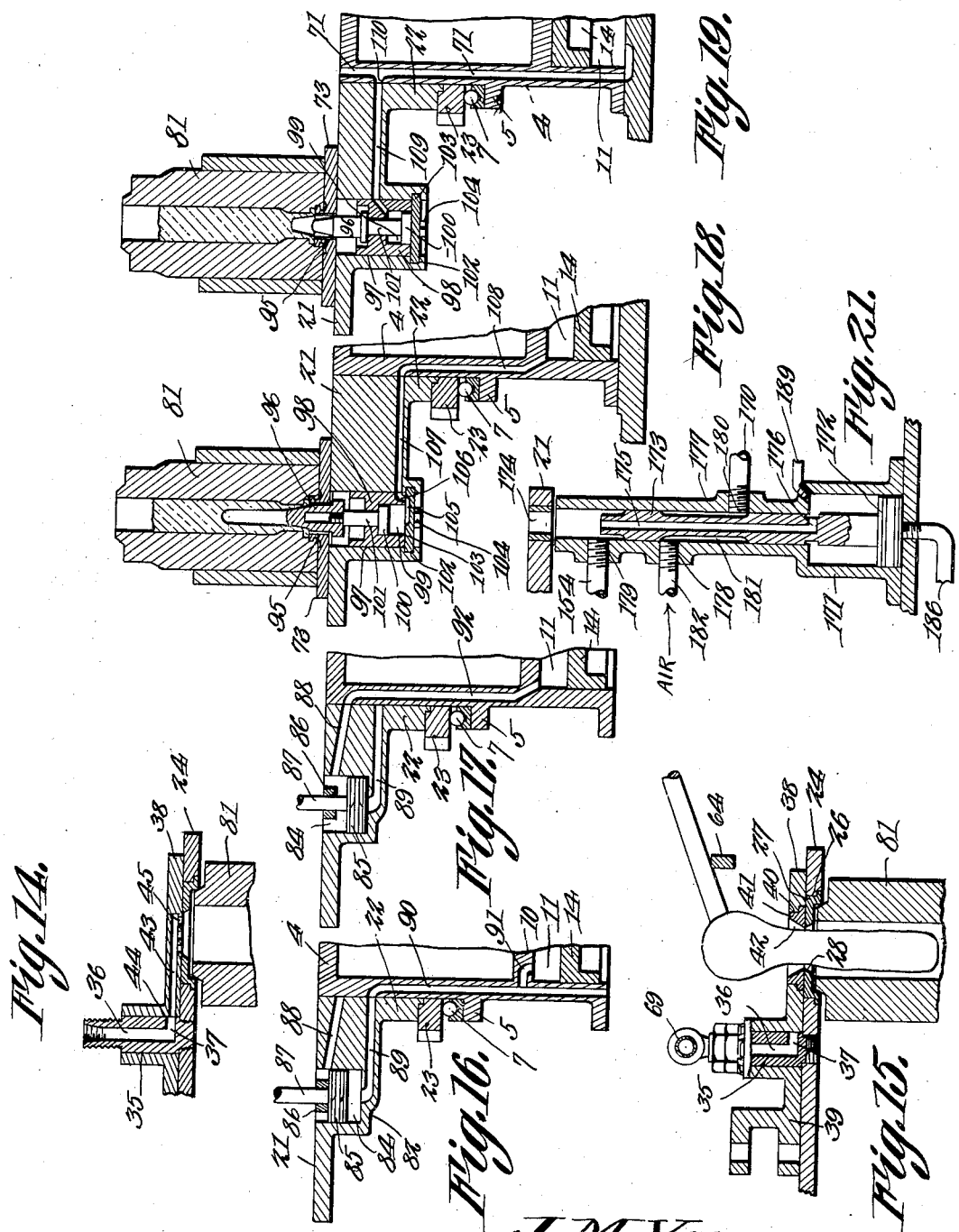

Patented June 12, 1923.

1,458,454

UNITED STATES PATENT OFFICE.

JAMES M. YOUNG, OF ANDERSON, INDIANA, ASSIGNOR TO OBEAR-NESTER GLASS COMPANY, OF ST. LOUIS, MISSOURI, A CORPORATION OF MISSOURI.

GLASS-BLOWING MACHINE.

Application filed October 21, 1916. Serial No. 126,935.

*To all whom it may concern:*

Be it known that I, JAMES M. YOUNG, a citizen of the United States, residing at Anderson, in the county of Madison and State of Indiana, have invented a new and useful Glass-Blowing Machine, of which the following is a specification.

This invention relates to machines for blowing glassware such as the so-called "narrow neck" ware although it is to be understood that the same can be adapted for the manufacture of articles of other types.

One of the objects of the invention is to provide a portable machine which can be moved from place to place to suit the convenience of the operator and facilitate the lifting of the molten metal from the furnace to the molds.

A further object is to provide a machine in which all of the parts operate automatically in properly timed relation whereby to pack the metal about the neck pin, withdraw the neck pin from the blank, initially blow the blank, and then automatically open the mold to release the blank.

A further object is to provide means operating in properly timed relation for holding and gripping the released blank and lifting it away from the blank mold, inverting it and automatically depositing it in an open blow or finishing mold.

A further object is to provide means for automatically closing the blow mold upon the deposited article, completing the blowing operation, and finally releasing the finished article to permit its ready removal from the machine.

Another object is to provide a novel arrangement of air controlled apparatus whereby the various steps of the operation mentioned can be carried out in proper succession and automatically.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 3 is a top plan view of the entire machine.

Figure 4 is a vertical section on line IV—IV Figure 2, said section being taken through the blank transferring mechanism.

Figure 4ª is a section on line IVª—IVª Figure 4.

Figure 1:
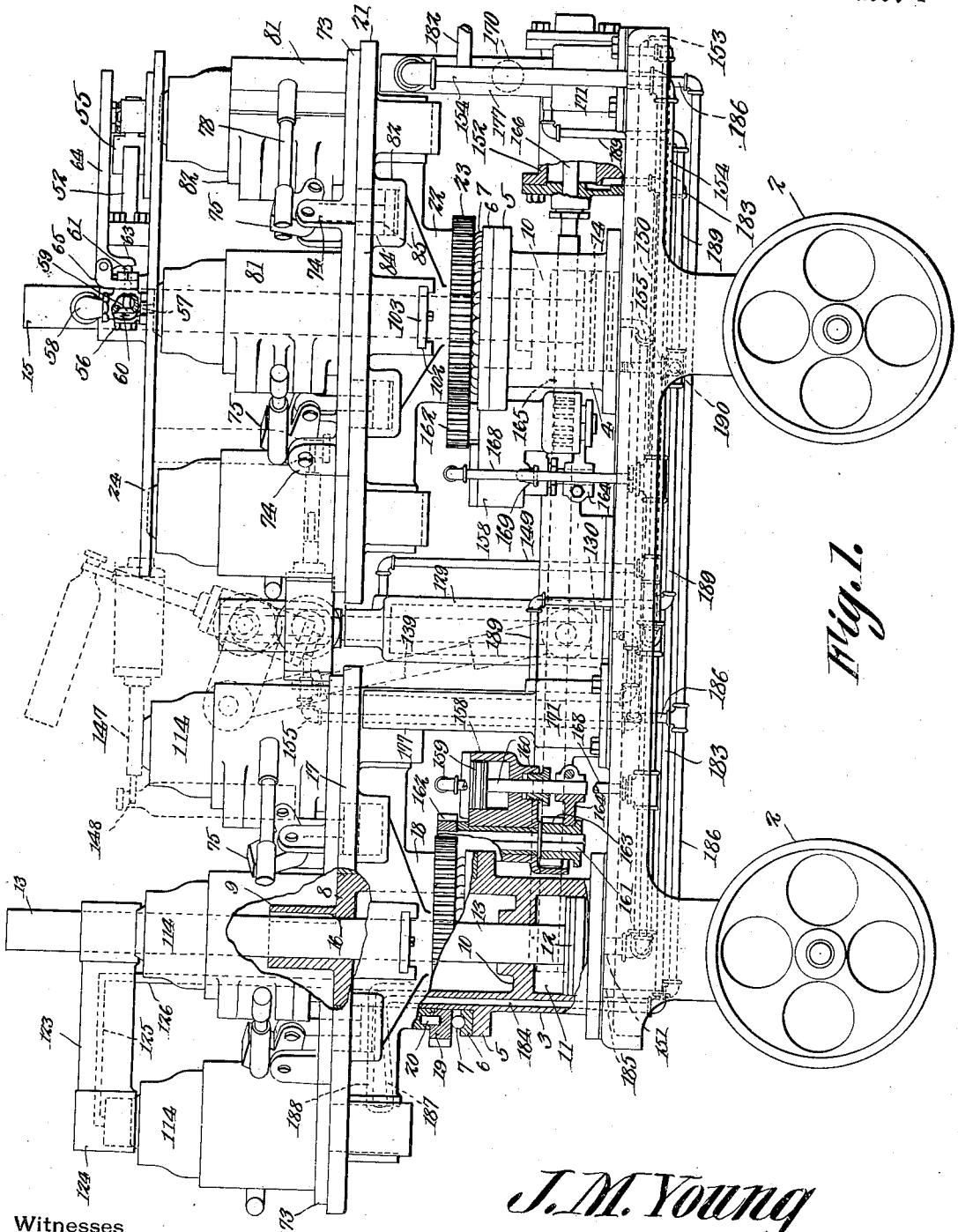
Figure 1 is a side elevation of the machine.
Figure 2:
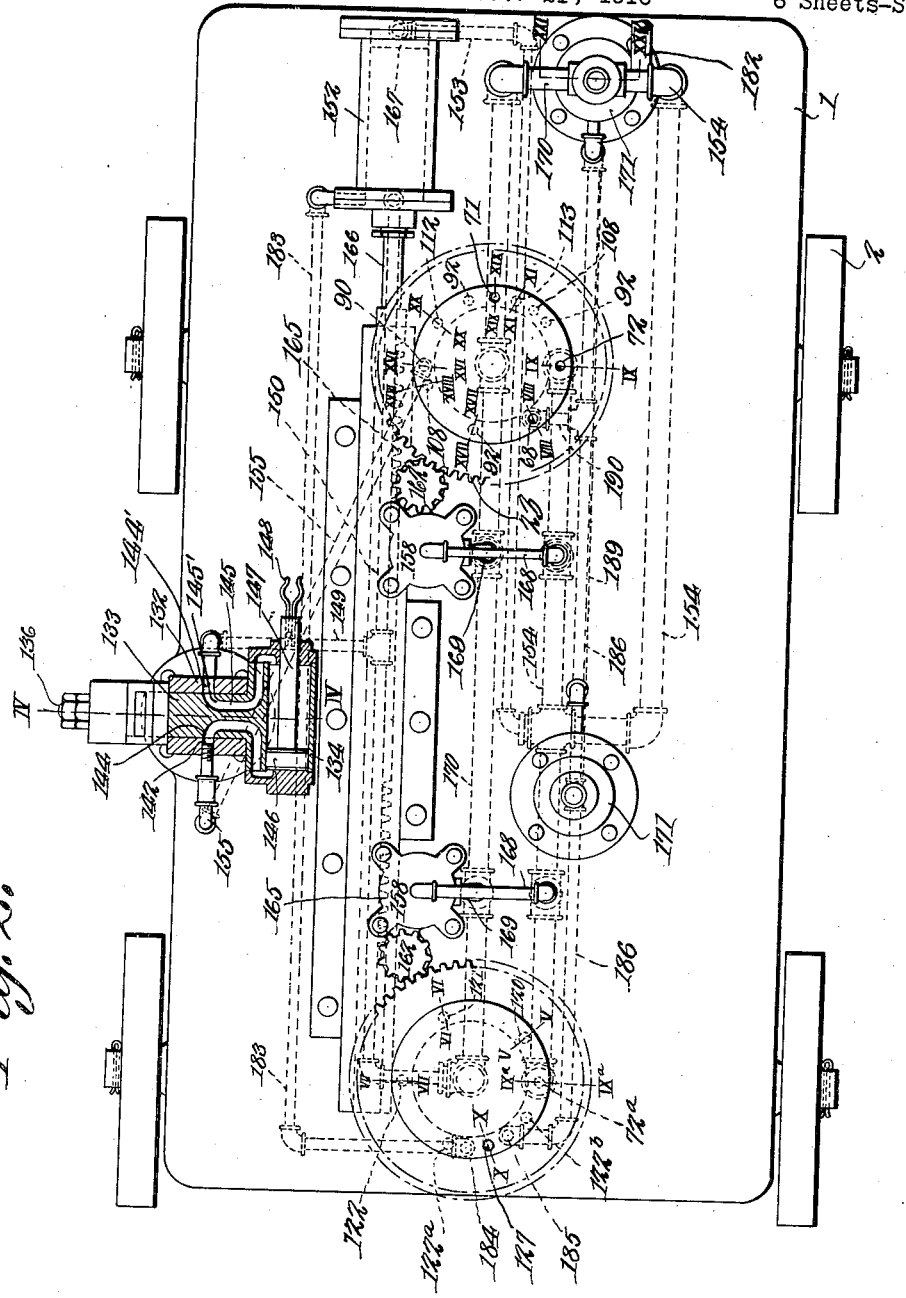
Figure 2 is a top plan thereof, the mold carrying structure being removed and the mold transferring mechanism being shown in horizontal section.

Figure 5 is a vertical section on line V—V Figure 2.

Figure 6 is a vertical section on line VI—VI Figure 2.

Figure 7 is a section on on line VII—VII Figure 2.

Figure 8 is a section on line VIII—VIII Figure 2.

Figure 9 is a section on line IX—IX Figure 2.

Figure 9ª is a section on line IXª—IXª Figure 2.

Figure 10 is a section on line X—X Figure 2.

Figure 11 is a section on line XI—XI Figure 2.

Figure 12 is a section on line XII—XII Figure 3.

Figure 13 is a section on line XIII—XIII Figure 3.

Figure 14 is a section on line XIV—XIV Figure 3.

Figure 15 is a section on line XV—XV Figure 3.

Figure 16 is a section on line XVI—XVI Figure 2.

Figure 17 is a section on line XVII—XVII Figure 2.

Figure 18 is a section on line XVIII—XVIII Figure 2.

Figure 19 is a section on line XIX—XIX Figure 2.

Figure 20 is a section on line XX—XX Figure 2.

Figure 21 is a section on line XXI—XXI Figure 2.

Referring to the figures by characters of reference 1 designates a carriage of any desired proportions and which is mounted on supporting wheels 2 whereby it can be moved readily from one furnace to another and adjusted into glass receiving position relative thereto.

Arranged on the carriage near the ends thereof are upstanding cylinders 3 and 4 each of which is provided at a point between its ends with an annular flange 5 supporting a ball race 6 on which are mounted anti-friction balls 7. The lower end of each cylinder is closed by the carriage 1, while the upper end of each cylinder has a head 8 from which projects a central tubular extension 9. A partition 10 is formed in each of the cylinders 3 and 4 so as to provide a piston chamber 11 in the lower portion of the cylinder. A piston 12 is mounted for reciprocation within the chamber 11 in the cylinder 3 and has a rod 13 which is slidably mounted in partition 10 and also extends through the tubular extension 9. Another piston 14 is mounted for reciprocation within the piston chamber in the cylinder 4 and has a rod 15 extending through the adjacent partition 10 and thence upwardly above the cylinder, this rod being indicated at 15. Both of the rods are held against rotation relative to the cylinders by keys 16.

Mounted for rotation about the upper portion of cylinder 3 is a table 17 designed to carry the blow or finishing molds of the apparatus, this table being formed with a central depending portion 18 to which is secured a ring gear 19 which bears downwardly on the balls 7. This ring gear may be attached to the portion 18 by pins 20 suitably spaced, or in any other desired manner.

A table 21 which carries the blank molds of the apparatus is mounted for rotation about the upper portion of the cylinder 4 and has a tubular depending portion 22 at the center thereof provided with a ring gear 23 which bears upon the adjacent balls 7. This ring gear can be secured to the tubular portion 22 in the same manner as is the gear 19.

A top disk 24 is adjustably connected by a clamp 24' to the nonrotatable rod 15 to conform to molds of different heights and is provided in the back portion thereof and adjacent the center of the apparatus with a deep peripheral recess or cut away portion 25. This recess is located above what is termed the delivery station of the table 21. If five blow molds are to be used on the table 21 then said table will be divided into five stations equally spaced and the recess 25 will be arranged above the third station which is the delivery station. Likewise the first station will be disposed approximately 144 degrees from the third or delivery station, while the second station will be located approximately 72 degrees from said delivery station. The disk 24 is provided, directly over the first or filling station with an opening 26 in which is seated a cutting die 27 having a central circular opening 28. See Figure 15. At the second or packing station, the disk 24 has a circular opening 29 over which is secured a cylindrical housing 30 in which a cap 31 is mounted for reciprocation. This cap has a stem 32 connected thereto and slidably mounted within the housing and a spring 33 is mounted on the stem and bears against the cap to hold said cap normally projected downwardly from the disk 24. Said cap 31 has a recess 34 in its lower face for the reception of the upper end portion of a blank mold, as hereinafter pointed out.

Extending upwardly from the disk 24 at a point adjacent the opening 26 is a pivot stud 35 having an air passage 36 extending downwardly therein and thence radially to form a port 37. Mounted for rotation on this stud is a combined shearing plate and blow head 38 which, as shown particularly in Figure 3, is substantially elliptical with an arm 39 extending laterally therefrom and beyond the stud 35. Formed in the head 38 is a circular opening 40 in which is mounted a ring-like shearing die 41 the opening in which is preferably flared upwardly as indicated at 42, thus to provide a funnel-shaped inlet for the molten metal.

An air passage 43 is extended from the stud receiving opening 44 in the shearing plate and terminates above a cluster of air vents 45 formed in the bottom of the plate 38 between one end of said plate and the opening 40. Thus during one movement of the plate 38 about its pivot stud 36 the opening 42 will be brought into register with the opening 28, the dies in the two openings will sever the molten metal or gather inserted therethrough, and the air vents 45 will be brought to position above and in communication with the opening 28. When these apertures 45 are thus located, the passage 43 will be in register with the port 37. At other times during the movement of the plate 38 the port 37 and the passage 43 are out of communication with each other.

Mounted on the disk 24 is a cylinder 46 having air ports 47 and 48 opening into the cylinder at opposite sides of a piston 49. An air passage 50 is extended radially through one of the heads 51 of the cylinder and this radial passage 50 is normally closed by the rod 52 of the piston. This rod, however, has an annular groove 53 adapted during the movement of piston 49, to momentarily register with the passage 50 and thus open communication through said passage. The rod 52 is pivotally connected as at 54 to a link 55 which, in turn, is pivotally connected to the arm 39 of the plate 38. In this connection see Figure 13.

Mounted on the disk 24 is a valve casing 56 having an air inlet port 57 and an air outflow pipe 58. This pipe extends to the port 48 in cylinder 46 and communication between the port 57 and the pipe 58 is normally closed by a valve 59 held to its seat by pressure from the port 57 and, if desired, by an auxiliary spring 60. The stem 61 of the valve extends through the casing 56 and is constantly engaged by a finger 63 depending from the pivot end of a lever 64 which is fulcrumed on a bracket 65 extending from the casing 56. This lever 64 is supported above the disk 24 and close to the opening 26 and constitutes a rest or support for a punty holding the gather. While the valve 59 serves normally to close communication between the port 57 and the pipe 58, it will be obvious that when a punty containing a gather is placed on lever 64 and said lever is caused to move downwardly, the finger 63 will push against stem 61 and open the valve, thus to allow air under pressure to pass from port 57 to the pipe 58 and thence to the port 48 in the cylinder so as to actuate the piston 49 and cause it to pull through the link 55 upon the arm 39 of the plate 38. Thus the opening 28 will be moved away from the opening 42 with the result that the gather will be sheared off, after which the apertures 45 will be brought into register with the opening 28 and placed in communication with the passage 36 in the stud 35.

A pipe 66 extends from the port 57 to the lower end of the radial passage 50 in the cylinder head 51 and another pipe 67 extends from the upper end of the passage 50 to a port 68 extending straight through the wall of cylinder 4 from the top to the bottom thereof, as shown in Figure 8. This pipe 67 is provided with a branch 69 which opens into the top of the stud 35 so that when air under pressure passes upwardly through the passage 50 from port 57 while the groove 53 is in communication with the passage 50, a portion of the air will pass through the pipe 69 to the stud 35, while the remainder of the air will pass into the air passage 68.

A pipe 70 extends from the port 47 of cylinder 46 and communicates with a passage 71 extending downwardly within the wall of cylinder 4 as indicated particularly in Figure 19.

The port 57 heretofore referred to is in communication with a passage 72 formed longitudinally within the wall of the cylinder 4 as shown particularly in Figure 9. Thus it will be seen by referring to Figure 2 that there are three passages in the wall of cylinder 4 which open through the upper end of said cylinder, said passages being indicated at 68, 71 and 72. These passages may be connected to the respective parts on the disk 24 by any suitable flexible piping whereby disk 24 can raise and lower relative to the cylinder without disconnecting or breaking the air passage.

Secured on the table 21 at regular distances apart are plates 73 equal in number to the number of stations to which a mold may be brought during the actuation of the apparatus. In the present instance where five molds are employed, there are five stations and, consequently, five plates 73 are attached to the table 21. The same arrangement of plates 73 is provided on the table 17. Each plate constitutes a base for supporting one of the molds of the apparatus and a portion of the plate has upstanding ears 74 between which is mounted a bell crank lever 75. Each of these bell crank levers has stems 76 extending from the upper arm thereof, the outer ends of the stems being preferably provided with balls 77 seated in sockets within links 78. These links, in turn, are mounted on balls 79 carried by stems 80 which extend laterally from the members of the mold. The molds on the table 21 constitute blank molds and have been indicated at 81. The members of the molds 81 are hingedly connected as at 82 and as the stems 80 extend from the respective members of each mold, it will be apparent that when one of the bell crank levers 75 is shifted so that its upper arm will swing backwardly toward the center of the table 21, said lever will pull through the links 78 upon the two members of the mold combined therewith so as to cause said members to swing apart. When the movement of the bell crank lever is reversed, the mold members will be swung toward each other and held.

For the purpose of actuating each bell crank lever 75, the table 21 is provided under the lower arm of each bell crank lever with a depression 82 the upper end of which is closed by the adjacent plate 73. In this depression is provided a piston chamber 84 and a piston 85 is mounted to reciprocate within said chamber as indicated in Figure 16. A stop ring 86 is mounted in the upper portion of the chamber and serves to limit the upward movement of the piston 85. Said piston is connected by a rod 87 to the lower end of the bell crank lever. Thus when the piston is moved upwardly the members of the mold 81 will be moved away from each other, whereas when the piston is moved downwardly said members will be swung toward each other so as to close the mold. Formed within the table 21 are upper and lower ports 88 and 89, the upper port opening into the chamber 84 near the upper end thereof, while the lower port opens into the bottom of the chamber 84. Both of these ports are normally closed at their inner ends by the cylinder 4 but there is provided in the wall of said cylinder a longitudinal passage 90 adapted to register at its upper end with the port 89 once during each rotation of the table 21. This passage 90 has a branch passage 91 which opens through the partition 10 in cylinder 4 and into the upper portion of the piston chamber in said cylinder. This passage 90 is so located in the cylinder 4 that the registration of the passages 89 and 90 will take place just before a mold reaches the third station during the rotation of the table 21. At a point between the passage 90 and passage 68 there is provided in the wall of cylinder 4 a passage 92 the lower end of which opens into the piston chamber in said cylinder, while the upper end is adapted to register with the passage 88 in the table 21. Other passages 92 are formed in the cylinder wall at points indicated. Thus during several stages of the rotation of the table 21, the passage 88 will be brought successively into register with the passages 92.

Formed within each of the plates 73 and concentric with the closed mold 81 on said plate is an opening 95 for the reception of a neck pin 96. The opening 95 communicates with the upper end of a larger opening 97 which extends through the table 21 and contains a block 98 the lower end of which is recessed as at 99. In this recess is mounted a piston 100 having a stem 101 the upper end of which is attached to the neck pin 96. Grooved retaining ribs 102 are arranged under the table at opposite sides of the opening 97 and are parallel, these grooves being adapted to receive a closing plate 103 having rounded ends and straight sides and which plate is adapted to be inserted upwardly between the ribs and then given a quarter turn to bring the rounded ends of the plate into the grooves in the ribs. Bolts 104 are employed for holding this plate in engagement with the ribs. Said plate has a bypass 105 in its upper face communicating with a port 106 in the block 98 and said port in turn constantly registers with a passage 107 formed within the table 21. Thus it will be seen that communication is constantly maintained between passage 107 and the space 99 under the piston 100. The inner end of passage 107 is normally closed by the wall of cylinder 4 but located in the wall of cylinder 4 at a suitable point is a longitudinal passage 108 the lower end of which opens into the piston chamber in cylinder 4 while the upper end is normally closed by the table 21. When the table is in its first position the passage 107 registers with the upper end of the passage 108.

Opening through the block 98 near the upper end thereof so as to discharge air against the upper face of the piston 100 is a passage 109 shown particularly in Figure 19 and which extends within the table 21 and is normally closed by the wall of cylinder 4. While the mold is in its first position the inner end of the passage 109 registers with a branch 110 of the passage 71. This passage opens, at its lower end, into the lower end of the piston chamber in cylinder 4, as shown in Figure 19. Thus when air under pressure forces piston 14 down, air will flow through passage 108 and 107 forcing piston 100 up and allowing any residue of air which may be on top of piston 100 to escape through passages 109, 110 and 71. Just before the table moves again, air under pressure forces piston 14 up and at the same instant the air flows through passages 71, 110 and 109, thereby forcing piston 100 down before the table has a chance to move. The air under piston 100 at this time will escape through passages 107 and 108 into the top of chamber 11 thence through passage 72 into a line 154 hereinafter referred to.

Another passage 111 (see Figure 20) opens into the upper portion of the opening 97 and is normally closed at its inner end by the cylinder 4. However, when the mold arrives at its second stage this passage 111 is adapted to register with a longitudinal passage 112 formed in the wall of cylinder 4 and opening at its lower end into the upper end of the piston chamber in said cylinder. A valve 113' may be provided for controlling the flow of air through the passage 112 and thus regulate the initial blowing of the blank. The passage 111 is also adapted to move into register with a passage 113 formed in the wall of cylinder 4 for the purpose of exhausting air from around the neck pin while the gather is being packed within the blank mold. This passage has been shown in Figure 11.

It might be stated that the table 17 has blow or finishing molds 114 mounted on the respective plates 73, each of these blow molds being made up of hingedly connected sections and being movable to open and closed positions by mechanism such as has already been described with reference to the molds 81. As shown in Figures 5, 6 and 7, pistons 115 are mounted for reciprocation within the table 17, the actuation of the pistons being controlled by passages 118 and 119, the lower one, 119 of which is adapted to move into register with a longitudinal passage 120 into the wall of cylinder 3 and which passage opens into the upper portion of the piston chamber in said cylinder. The upper passage 118 is adapted to move successively into register with the upper ends of passages 121, 122, 122ª and 122ᵇ formed in the wall of cylinder 3, the passage 121 opening into the lower end of the piston chamber in said cylinder, while the passage 122, 122ª and 122ᵇ, which are alike, open into the upper end of said chamber.

Adjustably secured to the piston rod 13 by a clamp 123' is an arm 123 which, while capable of up and down movement with rod 13 is at the same time held against rotation. This arm 123 carries a blow head 124 which constantly overhangs the third mold position on the table 17. This blow head is adapted to be seated upon the upper end of the closed blow mold and the arm 123 has an air passage 125 which opens into the blow head and is in communication, through a pipe 126, with a passage 127 formed in the wall of cylinder 3. (See Figure 10.) The lower portion of this passage opens into the piston chamber in the cylinder 3 and the flow of air through said passage 127 may be controlled by means of a valve 128.

Mounted on the carriage 1 between the back portions of the tables 17 and 24 is an upstanding cylinder 129 (see Figure 4). In this cylinder is mounted a piston 130 having a rod 131 which is slidably mounted in the upper end of the cylinder and is provided at its upper end with a bearing 132. This rod has a passage 131ª extending therethrough and through the piston. Mounted for rotation within the bearing 132 about an axis located at right angles to the rod 131 is a stud 133 extending from the middle portion of a cylinder 134. Secured to this stud is a crank arm 135 to which is adjustably connected a wrist pin 136. This wrist pin carries a bushing 137 on which bears a tubular coupling member 138 adjustably engaging one end of a rod 139. The other end of said rod is adjustably mounted within a tubular coupling member 140 which is mounted to swing upon a pivot stud 141 extending radially from the lower portion of the cylinder 129.

Formed in the bearing 132 is a port 142 and formed within the cylinder 134 and its stud 133 are passages 144 and 145. Passage 144 opens into a passage 143 extending partly around stud 133 and normally registering with port 142 and passage 131ª. Passage 145 has a port 145' adapted, on completion of one half rotation of stud 133 to register with the port 142. Passage 144 opens into one end of cylinder 134 while passage 145 opens into the other end of said cylinder. Mounted for movement in the cylinder is a piston 146 having a rod 147 from which extends spring gripping jaws 148. This cylinder is so positioned that when the piston 146 is shifted toward the table 21, the spring jaws 148 will enter into the opened mold on said table at the third or delivery position and will automatically slip onto the neck of the molded object, which object is in an inverted position while in the blank mold. An exhaust port 144' is formed in bearing 132 for escape of air through passage 144 from behind piston 146 after a blank has been transferred as hereinafter pointed out.

A pressure conducting pipe 149 opens into the upper end of cylinder 129 and extends from a pipe 150 one end of which opens into a port 151 formed in the bottom of cylinder 3. The other end of pipe 150 opens into one end of a cylinder 152. The other end of cylinder 152 has a pipe 153 extending therefrom to a pipe 154 which serves to direct air under pressure to the passage 72 in cylinder 4 and to a corresponding passage 72ª in cylinder 3.

A pipe 155 maintains communication between the port 142 and the passage 90.

Interposed between the two cylinders 3 and 4 are upstanding cylinders 158, these cylinders each having a piston 159 therein provided with a downwardly extending rod 160. A shaft 161 is journaled within the wall of the cylinder 158 and has a gear 162 at its upper end which constantly meshes with the adjacent ring gear 19 or 23. Another gear 163 is slidably mounted on but rotates with the lower portion of each shaft 161 and this gear is engaged by a shifting yoke 164 which is fastened to the piston rod 160. When the gears 163 are in their raised positions they mesh with a rack 165 one end of which is formed with or secured to a piston rod 166 extending from a piston 167 mounted to reciprocate within the cylinder 152.

Pipes 168 extend from the pipe 154 to the upper ends of the cylinders 158 and additional pipes 169 connect the lower ends of the cylinders 158 to a pipe 170 which connects the ports in the lower ends of the cylinders 3 and 4.

Mounted under each of the tables 17 and 21 is locking mechanism of novel form, as shown in detail in Figure 21. Each locking structure includes a cylinder 171 in which is mounted a piston 172 having a locking rod 173 designed, when the piston is raised, to enter any one of a series of openings 174 formed in the table thereabove. This rod 173 has a longitudinal passage 175 in the lower end of which is provided a radial port 176.

Within a tubular standard 177 upstanding from the cylinder 171 and surrounding the rod 173 are superposed ports 178 and 179 and at a diametrically opposed point in said standard and below the port 178 is another port 180. A longitudinally reduced portion 181 is provided on the rod or stem 173 and when the piston 172 is in its normal position, this reduced portion, which extends around the rod, maintains communication between the ports 178 and 180. When the piston 172 is in its raised position, the annular reduced portion 181 maintains communication between the ports 178 and 179.

An air supply pipe 182 opens into the port 178 and furnishes a constant supply of air under pressure to the apparatus. When the piston 172 is in its lowermost position, the air under pressure flows from the pipe 182 downwardly around the reduced portion 181 to the port 180 with which pipe 170 is connected. The port 179 is in communication with the pipe 154 and air is permitted to exhaust from this pipe through port 179 through the top of the standard 177 when the piston is in its lowermost position as shown in Figure 21.

Extending from the side of cylinder 152 at that end thereof engaged by pipe 166 is a pipe 183 which opens into the lower end of a passage 184 formed in the wall of the cylinder 3. Another passage 185 is formed in the wall of cylinder 3 and is connected at its lower end to a pipe 186 and which pipe opens into the bottoms of the cylinders 171.

The two passages 184 and 185 are adapted at a certain stage during the rotation of the table 17, to register with passages 187 and 188 formed in the table and which communicate through the piston chambers 84 in the table 17. When these passages 187 and 188 are in communication with the passages 184 and 185, communication is established between the pipe 183 and the pipe 186. Air is supplied to the tops of the cylinders 171 through a pipe 189 which communicates through a branch 190 with the passage 68.

Inasmuch as air is constantly furnished to one of the cylinders 171 under pressure from the pipe 182 it will be apparent that this pressure will be normally distributed through pipe 170 into the lower portions of the cylinders 3 and 4, thus to hold the pistons 12 and 14 elevated with the result that the arm 123 and the top disk 24 will be held in raised positions. Likewise air will be distributed from the pipe 170 to the bottoms of the cylinders 158 through pipes 169, this resulting in the elevation of the pistons 159 and the coupling of the gears 163 to the respective racks 165. Likewise a portion of the air under pressure will be directed from pipe 170 to pipe 150 so that the piston 167 in cylinder 152 will be held at the outer end of said cylinder. The air under pressure will also be distributed from cylinder 152 through the pipe 183 to the passage 184. When the parts are thus located air will exhaust through pipe 153 from cylinder 152 and through pipes 168 from cylinders 158 to the pipe 154 and thence out through the top of the tubular standard 177 shown in Figure 21. As the passage 184 is in communication with the passage 185 when the table 17 is at each stage of its movement, it will be apparent that while the air is being exhausted as described by way of the pipe 154, additional air under pressure is being directed through these communicating passages 184 and 185 to the pipe 186 which thus operates to force the piston 172 upwardly, thereby to lock the table 21 against rotation and at the same time establish communication between the pipes 154 and 182 and establish communication between the pipe 170 and the exhaust vent 175.

When the table 21 is in its first position the passages 92, 108, 113 and 71 are in communication with the passages 88, 107, 111 and 109 respectively. Consequently the pressure of air above the piston 14 will be distributed so as to press down on the piston 85 and hold the blank mold closed, as shown in Figure 17 and to press upwardly on the piston 100 so as to hold the neck pin 96 within the mold as shown in Figure 18. Passage 113 constitutes an exhaust through passage 111 from the lower portion of the blank mold so that air in the blank mold will not interfere with the packing of the gather about the neck pin. When the punty holding the gather inserted into the blank mold is brought to rest upon the lever 64, the arm 63 of the lever will thrust valve 59 to open position with the result that the air held under pressure in the passage 72 will be directed through the pipe 58 into one end of the cylinder 48, thereby causing the piston 49 in said cylinder to shift longitudinally and pull through the connection 55 upon the arm or extension 39 of the plate 38. Thus the gather, which has been inserted through the central opening in the plate 38 will be sheared off by the cooperating parts 27 and 41 and the cluster of apertures in the plate 38 will be brought to position above the blank mold. As the plate is thus swung about its pivot stud 35, the passage 43 which extends to the apertures 45 will be brought into register with the lower end of the passage 36 in the stud 35. As plate 39 is shifted by the piston 49 the groove 53 in the rod 52 is brought into register with the ports 50 and 66 with the result that air is free to flow from pipe 66 to port 50 and thence through pipes 67 and 69 to stud 35 so that the gather within the blank mold will be packed downwardly in said mold and about the neck pin in the lower portion thereof. A portion of the air will also pass from pipe 67 into the passage 68 and thence to the pipe 189 which will force the pistons 172 downwardly and unlock the table and at the same time permit air to exhaust from pipe 154 and place the pressure pipe 182 again in communication with pipe 170. When the piston 172 is thus shifted the air pressure from pipe 182 will flow into the pipe 170 with the result that the pistons in the cylinders 158 which have been held down by the pressure in the pipe 154, will be thrust upwardly, thereby raising the gears 163 into mesh with the racks 165. At the same time pressure will be directed against the piston 167 through pipe 150 with the result that the racks will be drawn toward the right in Figure 2 and motion transmitted therefrom through the gears 162 to the gears on the tables and said tables caused to move from one station to another.

When the pistons are moved upwardly for the purpose of releasing the blank molds from the parts thereabove some of the air under pressure flows through the passage 71 into the passage 109, thus withdrawing the neck pin from the gather. At the same time a portion of the air is exhausted through port 91 into passage 90 with the result that piston 85 is thrust upwardly and the blank mold is opened to expose the gather. On the completion of this operation the gather is brought into position to be acted on by the lifting and reversing mechanisms. It might be stated that when pressure is admitted to pipe 170 it is conducted to the upper end of the cylinder 129 so as to thrust downwardly on piston 130 and thus lower the lifting and reversing mechanism to active position. When the pressure is directed into the passages 90 the blank mold is not only opened as described, but a portion of the pressure is conducted through pipe 155 to the stud 133 and operates simultaneously to shift piston 146 to the right in Figure 2, thus to cause the clip 148 to embrace and engage the neck portion of the blank. On completion of this operation, the additional pressure will flow downwardly through the groove 143 to the passage 131$^a$ and thence under the piston 130 so as to elevate the piston. By reason of the crank 135 and the rod 139, it will be obvious that during the elevation of the piston and of the stud 133, said stud as well as the cylinder 134 will be caused to rotate. The cylinder will make a one-half rotation and on completion of said one-half rotation, the blank will be held by the clip with its neck uppermost and within a waiting open finishing mold on the table 17.

It is to be understood that at the same instant the blank mold opens at the third station, the neck pin 96 connected to piston 100 is forced up by air under pressure coming through passages 107 and 108 which are adapted to register at this station. It is not necessary to pull this neck pin down again until after it arrives at the first station again.

As the pressure of air is reversed by the placing of a punty on the lever 64, and the pistons 12 and 14 are forced upwardly, piston 12 will direct air through the registering passages 122 and 118 with the result that the finishing mold will be closed tightly and held closed and when the table 17 is brought to its third station, and the movement of the piston 12 is reversed in the manner hereinbefore pointed out so as to cause the said piston to travel downwardly, the blow head 124 is brought downwardly onto the top of the finishing mold and communication is established between the passage 125 and the passage 127 so that the blowing of the article is completed, it being understood that the action of the air in blowing the article can be regulated by the valve 128. The blow mold is adapted to close around the blank at the instant the transferring mechanism completes its motion and as port 145′ has arrived to connect with port 142, the air which is still in line 155 will flow through port 142 into 145′ and 145 which will force the piston 146 back away from the blank thereby disengaging the fingers 148 from the blank and returning the piston to its initial position. When the blank has been transferred, the air behind the piston 146 will escape through passage 144 out through the port 144′. When table 17 reaches its final stage the finishing mold is opened in the manner hereinbefore pointed out, whereupon the article can be removed.

It will be understood that when the blank mold is brought to its second position and immediately prior to the opening of the blank mold the blank which is held under restraint by the cap 31 will be initially blown by air admitted into the bottom of the blank mold by way of passage 112 (see Figure 20).

What is claimed is:—

1. In a glass blowing machine, the combination with a blank mold and pressure operated means for closing the mold, of a pivot stud constituting a pressure conductor, a combined blow head and shearing plate mounted for oscillation above the blank mold and upon said stud, said blow head having a pressure passage and outlet, pressure operated means for shifting said blow head and shearing plate into and out of active position relative to the blank mold, and pressure operated means for oscillating the same to place the passage in the blow head and shearing plate into and out of communication with the stud.

2. In a glass blowing machine, the combination with a blank mold and pressure operated means for opening and closing the mold, of a combined shearing plate and blow head, pressure operated means for raising and lowering the same relative to the blank mold, means for automatically shifting the shearing plate to sever a gather, said shearing plate having an aperture therein movable into communication with the blank mold after the gather has been sheared, and means controlled by the movement of the shearing plate for placing said aperture in communication with a source of pressure.

3. In a glass blowing machine, the combination with a blank mold mounted for bodily movement, of a combined blow head and shearing plate, pressure operated means for shifting said blow head and shearing plate toward or from the blank mold, means operated by the lowering of a gather into the blank mold for shifting the shearing plate to sever the gather, said shearing plate having an outlet opening therein movable to position above the blank mold when the gather has been sheared, and means controlled by said movement of the shearing plate for placing the opening in communication with a source of pressure.

4. In a glass blowing machine, the combination with a blank mold, and a neck pin, of a combined shearing plate and blow head, means for raising and lowering the same relative to the blank mold, means for automatically shifting the shearing plate to sever a gather, and pack it within the blank mold and around the neck pin, said shearing plate having an aperture therein movable into communication with the blank mold after the gather has been sheared, and means controlled by the movement of the shearing plate for placing said aperture in communication with a source of pressure, and pressure operated means for withdrawing the neck pin from the gather.

5. In a glass blowing machine, the combination with a blank mold mounted for movement, normally uncoupled means for moving the blank mold, and means for locking the blank mold against movement, of a punty actuated element adapted to be operated during the lowering of a gather into the blank mold, and separate pressure operated means controlled by the actuated punty operated means for severing the gather, packing it within the mold, coupling the mold moving means, and unlocking the mold.

6. In a glass blowing machine, the combination with a blank mold mounted for movement, normally disengaged means for moving the blank mold, and means for locking the blank mold against movement, of a punty actuated element adapted to be operated during the lowering of a gather into the blank mold, separate pressure operated means controlled by the actuated punty operated means for severing the gather, packing it within the mold, operatively connecting the normally disengaged mold moving means, and unlocking the mold, and means controlled by the locking means when shifted to unlocking position, for successively shifting the mold, and locking the mold against movement.

7. In a glass blowing machine the combination with a movably mounted blank mold and a movably mounted finishing mold, of transferring mechanism interposed between the molds and including pressure operated means for engaging the neck portion of a blank in the blank mold, and pressure operated mechanism for swinging said means to lift the engaged blank from its blank mold and deposit it in an inverted position in the finishing mold.

8. In a glass blowing machine the combination with movably mounted blank and finishing molds, of spring jaws interposed between the molds for engaging a blank, means for thrusting said jaws into the blank mold to press against and snap upon the neck portion of the blank therein, and means for automatically swinging said engaging means through an arc to remove the blank from its blank mold and deposit it in the finishing mold.

9. In a glass blowing machine, the combination with movably supported blank and finishing molds and inverting and transferring mechanism interposed between the molds, of a punty operated element adapted to be actuated by the lowering of a gather into the blank mold, and separate pressure operated means controlled by said element for severing and packing a gather in the blank mold, opening the blank mold, operating the transferring and inverting mechanism to convey the blank to the finishing mold, closing the finishing mold and blowing the blank within said finishing mold.

10. In a glass blowing machine, the combination with movably supported blank and finishing molds, and blank transferring and inverting mechanism interposed between the molds, of a punty operated element adapted to be actuated by the lowering of a gather into the blank mold, pressure operated means controlled by said element for severing and packing the blank within the blank mold, and separate pressure operated means controlled by said element and including a mold locking means, for opening the blank mold, actuating the blank transferring and inverting mechanism to direct a blank into a finishing mold, and for blowing the blank within the finishing mold.

11. In a glass blowing machine, the combination with revoluble series of blank and finishing molds, pressure operated racks, and mechanism for transmitting motion from the racks to the respective series of molds, said mechanism including shiftable gears, of pressure operated means for shifting said gears to couple the racks to the series of molds and to uncouple them therefrom.

12. In a glass blowing machine, the combination with a cylinder, a table mounted for rotation thereon, and a mold mounted on the table, of a neck pin slidably mounted within the table and adapted to project into the mold, a piston connected to the neck pin, and means controlled by the rotation of the table relative to the cylinder for directing pressure against the piston to raise or lower the neck pin.

13. In a glass blowing machine, the combination with a cylinder, a table mounted for rotation thereon, and a mold mounted on the table, of a neck pin slidably mounted within the table and adapted to project into the mold, a piston connected to the neck pin, means controlled by the rotation of the table relative to the cylinder for directing pressure against the piston to raise or lower the neck pin, and means controlled by the relative movement of the table and cylinder for directing air under pressure into the mold subsequent to the withdrawal of the neck pin to initially blow a gather within the mold.

14. In a glass blowing machine, the combination with a cylinder, a table mounted for rotation thereon, and a mold mounted on the table, of a neck pin slidably mounted within the table and adapted to project into the mold, a piston connected to the neck pin, means controlled by the rotation of the table relative to the cylinder for directing pressure against the piston to raise or lower the neck pin, means controlled by the relative movement of the table and cylinder for directing air under pressure into the mold subsequent to the withdrawal of the neck pin to initially blow a gather within the mold, and a valve for controlling the initial blowing of the gather.

15. In a glass blowing machine, transferring mechanism including an upstanding cylinder, a piston therein, a cylinder connected to and movable with the piston, said cylinder being mounted for rotation about a diametrical axis at right angles to the path of the piston, a piston within said revoluble cylinder, a blank engaging clip connected to and movable with said piston, means for rotating the revoluble cylinder during the up and down movement thereof, and means controlled by the rotation of said cylinder for directing pressure into the revoluble cylinder to project the blank engaging clip to active position.

16. In a glass blowing machine, the combination with a movably supported blank mold and a movably supported finishing mold, of a neck pin cooperating with the blank mold, means for automatically disengaging the blank mold from the blank therein, means for directing the neck pin into the blank to support the blank while disengaged from its mold, and means for automatically engaging the released blank while engaged by the neck pin and lifting it from said neck pin and transferring the blank to the finishing mold.

17. In a glass blowing machine, the combination with a movably supported blank mold and a movably supported finishing mold, of means for automatically opening the blank mold to release the blank therein, a neck pin, means for automatically directing the neck pin into the blank to hold the blank while released from its mold, and means for automatically lifting the blank from the neck pin and transferring the blank to the finishing mold.

18. A transfer machine for bottle blowing machines in which a bottle blank is formed at one point and the bottle blank is blown into a finished bottle at another point, comprising an oscillatory structure provided with projectile and retractable means for grasping a bottle blank, means for raising and lowering the grasping means, and means for rocking the grasping means to invert a bottle blank carried thereby.

19. In a glass blowing machine, the combination with a rotatable table carrying a series of blank molds arranged thereon and a rotatable table having a series of blow molds arranged thereon, a pressure operated rack extending alongside of both of said tables, a ring gear on each of said tables, shafts journaled adjacent to each of said tables, each of said shafts having a gear at one end adapted to mesh with the ring gear of the adjacent table and having a gear slidably mounted on its other end adapted to rotate therewith, and pressure operated means for coupling and uncoupling said sliding gears with said pressure operated racks to transmit motion from the rack to the respective tables.

20. In a machine of the character described, the combination of a plurality of traveling mold supporting devices located side by side provided with molds and each adapted to carry its molds from one position to another for various operations upon the contents thereof, and means for transferring the contents of a mold on one device to a mold on the other device, and simultaneously reversing the position of said contents.

21. In a machine of the character described, the combination with a rotary table supplied with blank molds, and a rotary table supplied with blow molds, said two tables located side by side, means for intermittently moving the tables, said blank molds being shaped so as to form the blank inverted, and said blow molds being shaped to form the completed article upright, and means for removing the contents of the blank molds, inverting it and transferring it to the blow molds.

22. A transfer device for a semi-automatic bottle-blowing machine in which bottle blanks are formed at one point with the necks down and are blown into finished bottles at another point with the necks up, comprising means for transferring the bottle blank from the blank forming to the bottle-blowing portion of the machine, said transferring means including means for grasping the bottle blank at the lower neck portion, means active during the transfer operation to invert the bottle blank, and means for elevating the neck of the bottle blank to compensate for the inversion.

23. A transfer machine for bottle-blowing machines in which a bottle blank is formed at one point and the bottle blank is blown into a finished bottle at another point, comprising an oscillatory structure provided with projectile and retractable means for holding a bottle blank, means for raising and lowering the holding means, and means for rocking the holding means to invert a bottle blank carried thereby.

In testimony that I claim the foregoing as my own, I have hereto affixed my signature in the presence of two witnesses.

JAMES M. YOUNG.

Witnesses:
WILLIAM W. LEIB,
GERTRUDE YOUNG.